United States Patent Office 2,709,647
Patented May 31, 1955

2,709,647

SHELLAC-BONDED ABRASIVE ARTICLES AND METHODS OF MANUFACTURING THE SAME

George J. Goepfert, St. Marys, Pa., and William A. Spilsbury, Sanborn, N. Y., assignors to The Carborundum Company, Niagara Falls, N. Y., a corporation of Delaware No Drawing. Application August 4, 1951, Serial No. 240,438

9 Claims. (Cl. 51—298)

This invention relates to shellac-bonded abrasive articles and methods of manufacturing the same. More specifically it is concerned with bonded abrasive articles such as grinding wheels or sharpening stones in which the bond comprises the heat-hardened reaction product of a mixture comprised essentially of shellac and melamine.

Abrasive wheels bonded with shellac have been made for a great many years by a hot molding process. In such a process a mixture of the abrasive grain and shellac is placed in a mold of suitable size and shape and subjected to hot pressing to first flux the bond, then compress the mass, and eventually upon continued heating to cause the shellac to gel from the continued heat treatment. When this stage is reached the article is cooled, removed from the mold, and given an oven treatment with a very slow increase in temperature up to about 335° F. and a prolonged bake at the top temperature to convert the shellac to a more or less infusible condition. The curing cycle requires nearly three days to reach the top temperature and about three days at that temperature.

The hot molding process is comparatively expensive because it ties up molds and presses for hours at a time and because it requires such long oven cures. It is also very difficult to make hot molded shellac bonded abrasives of different densities or structures as required in the industry and impossible to make the more open structures and softer grades corresponding to articles bonded with synthetic resins.

Cold molding processes in which a mix is prepared at ordinary temperatures, an article is pressed from the mix and immediately removed from the mold followed by curing in an oven have numerous advantages over the hot press process. They are much less costly because they do not require presses equipped with heated platens nor do they tie up molds for relatively long periods. Because of these advantages attempts have previously been made to provide compositions suitable for cold molding shellac mixes but thus far some such processes have been unsatisfactory for one reason or another.

We have discovered that the rate at which shellac can be cured can be very substantially increased if melamine is incorporated with the powdered shellac. We have also discovered that mixes including our improved bond can be cold molded provided suitable solvents and wetting agents are employed in making the mix.

One object of our invention is to provide abrasive articles bonded with shellac modified by melamine. Another object is to provide a method for increasing the rate at which the shellac of a shellac-bonded abrasive article can be cured. Another object of our invention is to provide methods and compositions for making shellac-bonded abrasives by a cold molding process. Another object of the invention is to provide a method of making shellac-bonded abrasives of open structure which will be readily reproducible and controllable. Other objects of our invention will be apparent from the disclosures herein made.

In making articles by the cold molding process according to our invention both the materials and the procedure employed depend upon the grit size. We have found that a process and basic composition which is suitable for relatively coarse grits is not entirely satisfactory where finer grits are being bonded. Accordingly in making articles where the grit is 80 grit or coarser we employ one type of composition and one procedure, whereas for grits 100 and finer we modify both the composition and the procedure. The exact grit size at which the change from one procedure to the other is made is not strictly critical since the fine grit molding procedure may be used with 80 grit and the other procedure may be employed with 100 grit or even finer grits, but generally speaking we have found it desirable to make the change in procedure at the grit sizes mentioned above.

With the coarser grit material we first mix the abrasive grains with a high boiling solvent for shellac such as tetrahydrofurfuryl alcohol, then add a heat-hardenable liquid resin such as a phenol-, urea-, or melamine-formaldehyde resin, and finally gradually add the mixture of powdered shellac and melamine to the grain and continue mixing until no free bond exists. We spread this mixture in a pan in a layer about 1 inch thick and dry it in the air at temperatures of about 60° F. for about 16–24 hours. At the end of that time the mix is caked up to some extent and we break it up and screen it through about a 12 mesh screen, return it to a mixer and wet it up with a mixture of a solvent such as tetrahydrofurfuryl alcohol and an oil such as raw linseed oil.

In making the finer grit materials we wet the grains with a mixture of high boiling solvent and oil, screen the moistened grain through about a 30 mesh screen, return it to the mixer, and add the mixture of pulverized shellac and melamine. This mass is mixed for a few minutes, again screened through about a 30 mesh screen, and again returned to the mixer and additionally mixed for about 2 minutes. These mixes are moldable immediately and do not require aging.

In molding articles we employ the conventional method of filling the mold with the mixture, pressing to a predetermined density in a stop mold, preferably "breathing" the mold by removing the pressure and again applying it, and finally removing the formed article from the mold and placing it on a suitable support. Fine grit wheels can be baked immediately whereas we prefer to give coarse grit wheels a preliminary dry for about 16–24 hours at about 110° F.

We will now describe our invention by reference to specific examples, it being understood that the examples are illustrative only and not limitative.

*Example I*

A wheel suitable for roll grinding was prepared from the following materials in the stated proportions:

| Materials: | Per cent by weight |
|---|---|
| 46 grit silicon carbide | 80.3 |
| Shellac-melamine mixture | 17.4 |
| Liquid resin | 2.3 |
| | 100.0 |

Tetrahydrofurfuryl alcohol _____ 7.0 cc. per 1000 grams of grain.

Tetrahydrofurfuryl alcohol-raw linseed oil _____ 3.0 cc. per 1000 grams of mix.

The materials were incorporated in the order described above in connection with coarse grit articles. The mixture of shellac and melamine consisted of 94.3% by weight of pulverized orange shellac and 5.7% by weight of powdered melamine. The tetrahydrofurfuryl alcohol-raw linseed oil mixture was in the proportion of 80% of the former to 20% of the latter by volume.

The liquid resin was an alkaline-catalyzed phenol-formaldehyde condensation product hardenable upon heating to an infusible insoluble condition. It had a viscosity of 300 centipoises at 20° C. and a solids content of 75%.

A wheel 12 inches in diameter, 1¼ inches thick and having an arbor hole 6 inches in diameter was molded to a density of 1.83 grams per cubic centimeter and after being dried at 110° F. for about 24 hours was cured by putting into an oven having a temperature of 185° F., holding at that temperature for 13 hours and then raising the temperature to 355° F. at a substantially uniform rate over a period of 16 hours. At the end of the heating period the articles were allowed to cool in the oven for about 18 hours during which time the temperature was gradually reduced to the point where the wheels could be handled. They were then dressed and provided with bushings according to conventional practice.

*Example II*

A fine grit wheel suitable for finishing rolls was prepared according to the following formula:

| Materials: | Per cent by weight |
|---|---|
| 240 grit silicon carbide | 86.3 |
| Shellac-melamine mixture | 13.7 |
| | 100.0 |

The mix was made in the manner described above in connection with fine grit wheels employing 15.0 cc. of the tetrahydrofurfuryl alcohol-raw linseed oil mixture of Example I for each 1000 grams of mix. The bond composition and the ratio of tetrahydrofurfuryl alcohol to linseed oil were the same as those of Example I.

A wheel 30 inches in diameter, 4 inches thick and having an arbor hole 12 inches in diameter was pressed from the mix to a density of 1.77 grams per cubic centimeter. After molding it was put into an oven having a temperature of 185° F., held at that temperature for 15 hours, and gradually raised to an ultimate temperature of 325° F. over a period of 37 hours. After the heat treatment it was cooled to a handling temperature over a period of about 7 hours and was finally dressed and bushed according to conventional practice.

The amount of bond employed depends upon the grit size and the grade or hardness of the wheel desired. Generally speaking, the grade ranges normally made contain from about 10–20% shellac where grits 100 and finer are used and from about 8–18% where coarser grits are used. In the latter we use from about 1.3 to about 2.3% of the liquid resin containing about 75% solids, the smaller amounts of liquid resin being used along with the smaller amounts of shellac.

The ratio of the solvent to the oil may be varied within the limits of about 50–90% solvent by volume to 10–50% of the oil. The proportions of 80–20 employed in the examples have been found to be quite satisfactory.

Although the specific examples describe the preparation of wheels for grinding rolls, the process is equally applicable to the production of shellac bonded abrasive articles designed for other purposes, such as for sharpening cutlery with so-called "Hemming" wheels and for cutting and polishing stones.

In addition to the reduction in cost resulting from the cold molding process, our invention has the advantage that it is adapted to make articles over wide ranges of grades and structures. Another advantage comes from the fact that results are highly reproducible so that it is possible to make articles of a desired grade and structure without substantial deviation from that wanted.

While we do not wish to be bound by any theories as to why our invention produces these highly desirable results, we have observed certain characteristics of the behavior of shellac alone and shellac when admixed with melamine which lead us to believe that melamine either catalyzes the gelling of shellac or, more probably, enters into reaction with the shellac. For example, if powdered shellac is introduced into a test tube and heated to its melting point it first foams before it is all melted and then settles into a foam-free liquid of comparatively low viscosity which eventually gels upon continued heating. If melamine in the proportion of about 1½ to 12% of the shellac is admixed with powdered shellac and such mixture is similarly heated it also foams initially, settles to a foam-free liquid, but gels in a much shorter time than where the melamine is not used.

When urea is used instead of melamine a mixture heated as described foams but gels so rapidly that it never settles back to a continuous mass as it does with the melamine or where shellac alone is heated. These observations have led us to believe that the satisfactory results are due to the fact that the melamine increases the speed of gelling to such a rate that it is possible to melt the shellac, get rid of the gaseous materials which cause the foaming, and then proceed with the gelling of the bond without the necessity of the long, comparatively slow heat treatment required where shellac is used alone. On the other hand, the gelling is retarded enough so that the bond does not gel while it is foamed up as occurs when urea is used.

If abrasive mixes are made using urea with shellac instead of melamine the ultimate products are bloated and the bond is spongy and porous. If an abrasive mix containing only shellac is heated too rapidly the bond melts and flows through the grains, causing slumping. Where articles are made employing the compositions and procedures of our invention no trouble is experienced either from slumping or from bloating.

An additional feature of our invention is the employment of the mixture of solvent and oil for the preparation of the mixes. As is apparent from the examples given, the amount of such mixture which is used depends somewhat upon the grit size and the kind of process employed. In making the fine grit wheel of Example II we used 15 cc. for each 1000 grams of mix and it has been our experience that this amount gives satisfactory mixes with many grits and grades. However, the exact amount may be varied in accordance with well-known practice in the abrasive industry, more being used if there is loose bond and less if the mix is too "wet."

It will be noted that the amount of liquid resin which we employ is comparatively small. Generally speaking, we either use none at all, as in the case of the fine grits, or at the most, from about 8–12% of the total resinous constituent of the bond including the shellac and the phenolic resin.

Although one great advantage of our invention comes from the fact that articles may be cold molded where melamine is added to the shellac, it is within the province of our invention to employ the melamine with the shellac in the manufacture of hot pressed wheels according to the old and conventional practice. Where this is done the melamine may be admixed in powdered form with the shellac before the bond is added to the grain or, in the case of coarse and medium grit wheels where the bond is premelted onto the grain, it may be stirred in with the oil customarily added to the shellac-coated grain after the melted mix had been broken up and prepared for molding. Since the melamine accelerates the cure of the shellac it is possible to obtain some of the advantages of our invention by employing it in this hot press process because the time required for hot pressing and for curing in the oven are both substantially reduced. The following is an example of such an article and process:

*Example III*

846 parts by weight of 120 grit fused aluminum oxide was mixed with 3 grams of raw linseed oil to moisten the grain and there was then added a mixture of 137 parts of shellac and 17 parts of melamine. The wetted grain and bond mixture was stirred until the powdered bond was uniformly distributed through the mix whereupon a weighed portion of the mix was placed into a mold. A conventional top plate was placed in the mold on top of the mix and the mold with its contents put between the platens of a press provided with upper and lower chambers connected for the admission of either steam or cold water. The mold was closed to a predetermined point calculated to give the desired density in the finished product. Steam at a pressure of 50 pounds gauge was admitted to the heating chambers and the mold was left in place until the mixture had been heated throughout as indicated by the fact that powdered sulfur applied to the mold barrel at the portion corresponding to the center of the wheel had melted. The steam was then turned off from the platens and cold water admitted to cool the wheel. When the wheel was cool enough to handle the pressure was relieved, the mold and its contents removed from the press, and the pressed article removed from the mold and cured according to the cycle described in Example II. The wheel was then dressed and bushed according to conventional practice.

In the preparation of the cold press mixes we use a high boiling shellac solvent or a mixture of such solvent with an oil as indicated in Examples I and II. In those examples we have shown the use of tetrahydrofurfuryl alcohol and raw linseed oil. Other solvents which we have found to be satisfactory are lactic acid, diethylene glycol, and acetophenone. In general we may employ any shellac solvent which has a boiling point of the order of about 100° C. or higher, the limits being that the solvent must not evaporate so rapidly as to cause the mix to dry out too fast or too much and it must not evaporate so rapidly during the curing of the article that the bond bloats.

In our examples we have described the use of raw linseed oil. The oil apparently exerts a strictly mechanical function and other non-volatile oils may be substituted for the raw linseed oil. Examples of such materials are boiled linseed oil, Chinawood oil, castor oil and high-boiling mineral oils such as lubricating oils of suitable viscosity.

In order to modify the bond characteristics we may replace up to about 35% of the shellac by a heat-hardenable synthetic resin such as a powdered phenol-, urea- or melamine-formaldehyde condensation product, an alkyd resin or a condensation product of a diphenol with epichlorhydrin or with a diglycidyl ether of a diphenol. While we usually employ an unfilled resinous constituent as the bond, we may modify the bond in conventional ways as by the addition of fillers such as clay or cryolite and other practices common in the abrasive industry may be employed without departing from the spirit of the invention the scope of which is defined in the appended claims.

We claim:
1. A bonded abrasive article such as a grinding wheel or a sharpening stone comprising a mass of abrasive grains bonded with a bond comprising the heat-hardened reaction product of a mixture comprising essentially shellac and melamine in the proportions of about 1.5–12 parts melamine to about 98.5–88 parts shellac.

2. An article as claimed in claim 1 wherein the bond mixture also comprises a shellac solvent having a boiling point of at least 100° C. and an oil which is substantially non-volatile at 350° F.

3. An article as claimed in claim 2 wherein the solvent is tetrahydrofurfuryl alcohol.

4. An article as claimed in claim 2 wherein the oil is linseed oil.

5. An article as claimed in claim 1 wherein the bond mixture additionally comprises 8–12% of a heat-hardenable phenol-formaldehyde resin based on the shellac.

6. In a method of making a bonded abrasive article such as a grinding wheel or a sharpening stone the steps which comprise moistening a mass of abrasive grains with a mixture of a high-boiling shellac solvent and an oil, mixing pulverized shellac and melamine with the wetted grains, cold molding an article from the mixture thus prepared, and heating the article to harden the bond.

7. Method as claimed in claim 6 wherein the mixture is first aged at room temperature for about 16–24 hours and is then moistened with an additional quantity of a mixture of shellac solvent and oil to make it cold moldable before the article is molded.

8. Method as claimed in claim 6 wherein the solvent is tetrahydrofurfuryl alcohol.

9. Method as claimed in claim 6 wherein the oil is linseed oil.

References Cited in the file of this patent

UNITED STATES PATENTS

| | | |
|---|---|---|
| 2,262,728 | Swain et al. | Nov. 11, 1941 |
| 2,311,911 | Swain et al. | Feb. 23, 1943 |
| 2,529,712 | Teague | Nov. 14, 1950 |